United States Patent Office 2,887,437
Patented May 19, 1959

2,887,437

PALATABLE VITAMIN TABLET CONTAINING AN AMINO ACID

Oscar Klioze, Floral Park, and Jerome T. Liebrand, Brooklyn, N.Y., assignors to Chas. Pfizer & Co., Inc., New York, N.Y., a corporation of Delaware No Drawing. Application August 22, 1956
Serial No. 605,489

5 Claims. (Cl. 167—81)

This invention relates to pharamaceutical compositions and processes for their preparation. More particularly, it concerns rapidly disintegrable, pleasant-tasting tablets containing certain vitamins and amino acids. These dosage formulations are especially designed to stimulate growth and whet failing appetite in children, but they can also be utilized for adults.

The problem of a child's flagging appetite and poor growth is a familiar and serious one in the pediatric field. Not only do many children refuse to eat enough, but also many children refuse to eat nutritionally-balanced diets. Among adults, too, physicians encounter many instances of finicky appetite and generally rundown condition, particularly among invalids, convalescents and over-fatigued individuals. For such conditions there are frequently prescribed dietary supplements of vitamin $B_{12}$, vitamin $B_6$, vitamin $B_1$, vitamin C and the essential amino acids.

Most of these today are administered in the form of capsules or tablets. Elixirs have been employed to some extent, but they have the disadvantage of poor stability if an aqueous medium is employed, and of unpleasant taste or sensation if the vehicle contains an oil. Sometimes vitamins are administered by injection, but the disadvantages of this method, especially for children, are well-known. Many tablets are not readily absorbed due to their inability to disintegrate at a sufficiently rapid rate. If they do disintegrate rapidly, then a very unpleasant taste usually results. The most common dosage form is the gelatin capsule containing the desired vitamins in an oil suspension. Unfortunately this type of capsule is generally a relatively large object for the consumer to swallow, and if inadvertently chewed or otherwise broken in the mouth, the unpleasant taste still results. This problem is particularly troublesome in the case of children, where the administration of any medicament is often complicated.

It is therefore, an object of this invention to provide a vitamin- and amino acid-containing tablet which meets the deficiencies of ordinary tablets, capsules, and other dosage forms of this type. A further object is to provide a multi-purpose tablet of the character described, which may readily be swallowed whole, chewed without objectionable taste, dissolved in the mouth, or dissolved in liquids such as infant formula and fruit juices for administration to infants and children, without the gritty aftertaste characteristic of many ordinary vitamin and amino acid preparations.

These and other objects are accomplished by the present invention, which provides a rapidly disintegrable, pleasant-tasting tablet comprising a plurality of compressed granules containing vitamin C, a plurality of compressed granules containing a mixture of vitamins $B_1$, $B_6$ and $B_{12}$ and a nutritionally essential amino acid, and a flavoring agent and a hydrophilic starch in the interstices between such granules.

The tablets of this invention are prepared by first forming the two types of granules by means of a suitable granulating technique, preferably by wet granulation. For this purpose, the medicaments are first thoroughly blended with a pharmacologically acceptable binding agent, and wet down with a solvent in an amount sufficient to render the mass suitable for passage through a granulating machine.

After formation of the granules, they may be dried simply by application of vacuum to the wet granules, or by blowing hot air through the mass during agitation. If desired, the air may be sterilized in any convenient manner, as by filtration and/or heat sterilization. The temperature of the air as it contacts the granules should be carefully regulated to avoid destruction or loss in potency of the therapeutic agents, a temperature from about 20 to 100° C. being satisfactory for most purposes. In some instances, a more elevated temperature may be employed if an inert gas such as nitrogen or carbon dioxide is used in lieu of air for drying purposes. Upon completion of the drying, the granules are preferably screened, to insure that they are of an optimum size for the formation of tablets. It has been found that granules ranging from about 20 to 100 mesh (U.S. sieve series) are most advantageous in preparing the tablets of this invention.

After drying and screening of all of the granules, they are blended together in the appropriate proportions for tabletting purposes. During this blending operation, other therapeutic agents which do not have an objectionable taste may be added, care being taken not to introduce a large proportion of finely divided material, since this would impair the tabletting operation. It may be desired, for instance, to add minerals or other vitamins already in granular form, such as gelatin-protected vitamins A and D which are available in the form of fine beadlets. Other agents which may be employed are dyes and conventional diluents, excipients and fillers. It is especially critical at this stage to blend in a hydrophilic starch, particularly potato, tapioca and rice starch. These materials act as disintegrants for the finished tablet. Since they are hydrophilic, they swell greatly and facalitate rapid disintegration of the tablet upon contact with liquids or saliva, in effect exploding the tablet. It is an important feature of this invention to include also in the final blending operation suitable flavoring agents which together with the hydrophilic starch become dispersed in the interstices between the blended granules in the ultimate tablet. In this manner, the flavoring agent is made promptly available upon disintegration of the tablet so that the objectionable taste of the vitamins and amino acids is promptly and effectively masked. Upon completion of the blending operation, the material is subjected to tabletting in the usual manner, preferably with the addition of a lubricant, such as stearic acid or magnesium stearate, to form a finished tablet containing a predetermined quantity of vitamins and amino acids per unit dosage form.

Besides the flavoring agent in the interstices between the granules, it is also preferred to incorporate sweetening agents, and if desired additional flavoring agents, within the granules themselves. Alternatively, sweetening agents may be incorporated in separate granules that disintegrate more rapidly than those containing the vitamins and amino acids. Both natural and synthetic sweetening agents such as saccharin and the sodium salt thereof, and sodium cyclohexyl sulfamate (Sucaryl) may advantageously be employed. The synthetic sweetening agents have been found to be most effective in masking the objectionable taste of the therapeutic agents. The pharmacologically acceptable binders for the vitaminaceous granules may themselves constitute sweetening agents, thus serving a dual purpose. For instance, various sugars and sugar alcohols are particularly advantageous, e.g. mannitol, sorbitol, lactose and sucrose.

A wide variety of natural and synthetic edible gums are also suitable as binding agents in the preparation of the aforesaid granules. While the natural gums are quite useful, it is preferred to employ certain synthetic gums due to their more uniform properties and binding characteristics. A particularly advantageous synthetic gum is polyvinylpyrrolidone (PVP), a high molecular weight polymer formed by the polymerization of vinylpyrrolidone by methods well known in the art. This product is commercially available under the trademark "Plasdone." For the purposes of this invention, polyvinylpyrrolidone having a K value ranging from about 26 to 36 is especially useful. The K value expresses the degree of polymerization of the polyvinylpyrrolidone, and is calculated from the relative viscosity or ratio of the viscosity of a dilute solution of PVP (such as a 1% solution) to the viscosity of the solvent i.e., water. A preferred form of polyvinylpyrrolidone exhibits a K value of 30, corresponding to an average molecular weight of 40,000. Other synthetic gums which may be employed for the purposes described are carboxymethylcellulose (CMC), and salts thereof, such as sodium carboxymethylcellulose; methyl cellulose; and certain polycarboxylic acid derivatives sold under the tramemark "Carbopol" by the B. F. Goodrich Company. Among the natural gums which may be employed are pectin, acacia, agar, tragacanth and the alginates, such as sodium alginate.

The pharmacologically acceptable binding agent is applied to the vitamins and/or amino acids in an inert solvent, such as water or suitable organic solvents. It is important that the solvent be one which does not adversely affect the therapeutic agents to be mixed therewith. The lower alkanols, such as ethanol, butanol and isopropanol are particularly useful for this purpose, and mixtures thereof with water are also suitable. In addition halogenated hydrocarbons, such as carbontetrachloride and ethylene dichloride, may also be employed to advantage.

If separate sweetening agent-containing granules are used, they are prepared in a manner similar to the procedure described above for preparing the medicament-containing granules. However in this case, it has been found that granulation is more readily effected if a mixture of water and a lower alkanol solvent is employed for wetting the granulation mass. A 66% w./v. solution of isopropanol in water has been found to be especially useful in this connection. After preparation of the granules, they are dried in the manner previously indicated, and screened, preferably to obtain granules of the same order of size specified for the medicament-containing granules, i.e. between about 20 and 100 mesh.

Vitamin $B_1$, available as thiamine mononitrate or thiamin hydrochloride, is a well known species of vitamin B whose function is directly connected with the nervous and circulatory systems. Its main use in the instant invention is to stimulate the appetite and aid carbohydrate metabolism. The MDR (minimum daily requirement) of vitamin $B_1$, has been established as one mg. for adults and 0.5 to 0.75 mg. for children. The amount of vitamin $B_1$ used in the products of this invention should generally be higher, however, because of the therapeutic end in view, i.e. it should range from about five mg. to about fifteen mg. per daily dose and twice that for adults, the preferred being 10 mg.

The need for vitamin $B_6$ in human nutrition has been established, but the MDR has not. The primary function of this vitamin is to improve protein metabolism. Pyridoxine hydrochloride is an advantageous form of vitamin $B_6$ which may be used in the practice of the present invention. The amount employed ranges from about one mg. to above five mg., the preferred amount being about three mg. for children daily, and about twice these figures for adults.

The need for vitamin $B_{12}$ (also known as cyanocobalamine) in human nutrition has been established, but the MDR has not. Its main function in the dosages of this invention is to stimulate growth. The amount of $B_{12}$ which is used may range from 10 to 30 mcg., although 20 mcg. daily is adequate for most children (twice these figures for adults).

Vitamin C, or 1-ascorbic acid, is very important in the growth processes, particularly the growth of bones and teeth. In the present invention it is notable for its function in hemoglobin formation and nucleic acid synthesis. The adult MDR of vitamin C is 30 mg. and the MDR for children is 20 mg. The amount of vitamin C that may be used in the practice of the instant invention ranges from about 10 mg. to about 40 mg. daily, and the preferred amount is about 25 mg. for children, or twice these figures for adults. It is preferred to employ salts of ascorbic acid, such as sodium and calcium ascorbates, to provide a finished product of improved taste.

In growth failure the dietary lysine-tryptophane ratio is low and necessary quantities and/or functioning of other essential amino acids can be absent or greatly reduced. Consequently, an important constituent of the products of this invention is at least one of the essential body-builders, the amino acids. Preferred for this purpose is L-lysine, which increases the lysinetryptophane ratio and thus improves protein metabolism. It is used in the form of a salt, like the hydrochloride, the preferred amount being from about 5 to 50 mg. although larger amounts may be employed if desired. Other useful amino acids are leucine, isoleucine, phenylalanine, threonine, methionine, arginine, histidine, valine and sometimes tryptophane.

This invention is illustrated by the following example, it being understood, however, that the invention is not to be limited thereby, since many other modifications and embodiments may be made without departing from the spirit and scope thereof.

A series of blends was prepared with the following ingredients in the proportions by weight specified.

Portion A

| Ingredients: | Milligrams/tablet |
| --- | --- |
| Cyanocobalamin[1] | 24.000 |
| Thiamine Mononitrate | 11.000 |
| Pyridoxine hydrochloride | 3.300 |
| Sodium saccharin | 4.000 |
| l-Lysine monohydrochloride | 15.000 |
| Mannitol | 75.000 |
| Sodium Sucaryl | 1.000 |
| Anhydrous citric acid | 1.629 |

[1] 0.1% trituration of U.S.P. grade in reagent grade mannitol.

Portion B

| Ingredients: | |
| --- | --- |
| Sodium ascorbate | 31.350 |
| Mannitol | 50.000 |
| Sodium Sucaryl | 0.500 |

Portion C

| Ingredients: | |
| --- | --- |
| Cherry flavor | 5.000 |
| Anise flavor | 1.750 |

Portion D

Ingredient: Rice starch _____ 9.9979

Each of portions A and B was thoroughly wetted down with a 66% isopropanol-water solution. Each wetted material was passed twice through a 12-mesh stainless steel screen in an oscillating granulator and then air-dried at room temperature for 2 hours followed by 120° F. for 6 hours. Each dried blend was again passed through a stainless steel screen in the oscillating granulator, this time at the 20-mesh size; and blend A was repassed once through a 30-mesh screen.

Portion D, the rice starch, was thoroughly wetted with a 95% ethanol-water solution, air-dried in the same manner as portions A and B, and then passed through a 20-mesh screen in the granulator. This material was then blended with the two flavoring agents of portion C until homogeneous.

This blend, portion A and portion B were then thoroughly commingled, together with calcium stearate as a filler and lubricant in the proportion of 1.6 mg./tablet. The final mixture of granulated A, granulated B, non-granulated C+D and lubricant was then punched into tablets each containing substantially the proportions of ingredients above given. It should be noted that the proportion of vitamin $B_{12}$ is designed to provide 110–130% above the desired dose of 20 mcg., hereinbefore indicated as preferred. The same is true of the vitamins $B_6$ and $B_1$, 100–120% of the optimum dose of each being used, to allow for storage losses and insure labelling accuracy. The lysine is similarly employed at a 110% overage based on the intended label claim.

The tablets so prepared were pleasant-tasting and disintegrated rapidly upon introduction to the mouth or to other fluids. It was found that they were readily chewed or swallowed without chewing since the rapid disintegration upon introduction to the mouth promoted the flow of digestive juices which in turn facilitated swallowing of the tablets. Upon shaking in a test tube at 37° C. the tablets completely disintegrated in less than 5 minutes.

What is claimed is:

1. A rapidly disintegrable, palatable tablet comprising a plurality of compressed granules containing vitamin C; a plurality of compressed granules contining vitamin $B_1$, vitamin $B_6$, vitamin $B_{12}$ and at least one nutritionally essential amino acid; a plurality of separate granules containing a sweetening agent that disintegrate more rapidly than those containing the vitamins and amino acids; and dispersed in the interstices between said granules a flavoring agent and a hydrophilic starch.

2. A rapidly disintegrable, palatable tablet comprising a plurality of compressed granules containing vitamin C and a sweetening agent in a pharmacologically acceptable binder; a plurality of compressed granules containing vitamin $B_1$, vitamin $B_6$, vitamin $B_{12}$, at least one nutritionally essential amino acid and a sweetening agent in a pharmacologically acceptable binder; a plurality of separate granules containing a sweetening agent that disintegrate more rapidly than those containing the vitamins and amino acids; and dispersed in the interstices between said granules a flavoring agent and a hydrophilic starch.

3. A rapidly disintegrable, palatable tablet comprising a plurality of compressed granules containing sodium ascorbate in a pharmacologically acceptable binder; a plurality of compressed granules containing thiamine nitrate, pyridoxine hydrochloride, cyanocobalamine and L-lysine in a pharmacologically acceptable binder; a plurality of separate granules containing a sweetening agent that disintegrate more rapidly than those containing the vitamins and amino acids; and dispersed in the interstices between said granules a flavoring agent and a hydrophilic starch adapted to swell rapidly on contact with water, thereby disintegrating said tablet.

4. A rapidly disintegrable, palatable tablet comprising a plurality of compressed granules containing a total of about 25 mg. of vitamin C and a sweetening agent, bound therewithin by a sugar alcohol; a plurality of compressed granules containing a total of about 10 mg. of vitamin $B_1$, about 3 mg. of vitamin $B_6$, about 20 mcg. of vitamin $B_{12}$, about 15 mg. of L-lysine and a sweetening agent, bound therewithin by a sugar alcohol; a plurality of separate granules containing a sweetening agent that disintegrate more rapidly than those containing the vitamins and amino acids; and dispersed in the interstices between said granules a flavoring agent and a hydrophilic starch adapted to swell rapidly on contact with water, thereby disintegrating said tablet.

5. A process for preparing rapidly disintegrable, palatable tablets which comprises granulating vitamin C with a pharmacologically acceptable binding agent, separately granulating a mixture of vitamin $B_1$, vitamin $B_6$, vitamin $B_{12}$ and at least one nutritionally essential amino acid with a pharmacologically acceptable binding agent, separately granulating sweeting agent in granules that disintegrate more rapidly than those containing the vitamins and amino acids, commingling all of the resulting granules with a flavoring agent and a hydrophilic starch, and compressing the resulting blend into tablets.

References Cited in the file of this patent

UNITED STATES PATENTS 2,410,417   Andersen _____ Nov. 5, 1946

OTHER REFERENCES

Annals of Surgery, January 1947, page 41 of the Ads.

Gutman: "Modern Drug Encycl." 5th ed., Drug Publ. Inc., N.Y., 1952, pp. 1032 and 1033.

J.A.P.A., Sci. ed., vol. 41, No. 9, September 1952, pp. 505 and 506.

Am. J. Pharmacy, vol. 113, No. 4, April 1941, p. 137.

Silver et al.: "Manuf. of Compressed Tablets," F. J. Stokes Machine Co., Phila., Pa., 1944, pp. 5, 59, 62 and 66.

U.S. Dispensatory, 25th ed., J.B. Lippincott Co., Phila., 1955, pp. 1205, 1206 and 1660.